(12) United States Patent
Jacobs et al.

(10) Patent No.: US 6,385,678 B2
(45) Date of Patent: *May 7, 2002

(54) METHOD AND APPARATUS FOR BUS ARBITRATION WITH WEIGHTED BANDWIDTH ALLOCATION

(75) Inventors: Eino Jacobs, Palo Alto; Tzungren Tzeng, San Jose, both of CA (US)

(73) Assignee: Trimedia Technologies, Inc., Milpitas, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/715,946

(22) Filed: Sep. 19, 1996

(51) Int. Cl.[7] .................. G06F 13/36; G06F 13/362
(52) U.S. Cl. ................ 710/113; 710/111; 710/120; 710/123; 709/213; 709/240
(58) Field of Search ............... 395/291, 296, 395/300, 303, 305, 200.43, 200.7; 710/111, 113, 116, 120, 123, 125; 709/213, 240

(56) References Cited

U.S. PATENT DOCUMENTS

| | | | |
|---|---|---|---|
| 4,375,639 A | | 3/1983 | Johnson, Jr. |
| 5,088,024 A | * | 2/1992 | Vernon et al. |
| 5,274,774 A | | 12/1993 | Manber et al. |
| 5,280,479 A | * | 1/1994 | Mary .......................... 370/85.6 |
| 5,280,591 A | * | 1/1994 | Garcia et al. ................ 395/291 |
| 5,367,679 A | | 11/1994 | Khaira |
| 5,463,624 A | * | 10/1995 | Hogg et al. ................. 370/85.6 |
| 5,471,590 A | * | 11/1995 | Melo et al. .................. 395/288 |
| 5,519,837 A | * | 5/1996 | Tran ............................ 395/291 |
| 5,533,205 A | * | 7/1996 | Blackledge, Jr. et al. ... 395/297 |
| 5,604,865 A | * | 2/1997 | Lentz et al. ........... 395/200.43 |
| 5,745,708 A | * | 4/1998 | Weppler et al. ............. 710/119 |
| 6,006,303 A | * | 12/1999 | Barnaby et al. ............. 710/244 |
| 6,016,528 A | * | 1/2000 | Jaramillo et al. ............ 710/243 |

FOREIGN PATENT DOCUMENTS

| | | | |
|---|---|---|---|
| JP | 08095906 A | 4/1996 | ......... G06F/13/362 |

* cited by examiner

Primary Examiner—Rupal Dharia
(74) Attorney, Agent, or Firm—Fenwick & West LLP

(57) ABSTRACT

A method and apparatus for bus arbitration wherein each bus agent is assigned a weight that governs the percentage of bandwidth allocated to the agent. In addition, each bus agent may also raise the priority of its request based on the amount of time that agent's request has not been serviced. Specifically, the waiting period for the agent is selected so that the agent would be guaranteed access to the bus such that a worst case latency constraint is satisfied. Finally, the arbitration scheme of the present invention can be split into multiple levels of hierarchy, such that when an agent wins arbitration at one level, it is passed to the next higher level where it competes with other agents for bus access.

39 Claims, 7 Drawing Sheets

METHOD AND APPARATUS FOR BUS ARBITRATION WITH WEIGHTED BANDWIDTH ALLOCATION

BACKGROUND

1. Field of the Invention

The present invention relates to the management of shared resources in information processing systems, and more particularly to schemes for controlling access to a common bus in such a system.

2. Description of the Related Art

The growing popularity of multimedia software has increased the need for computer systems to handle high-bandwidth, real-time transfers of data. Multimedia systems are distinguished from more traditional computing systems by a high degree of real-time interactivity with the user. This interactivity is accomplished through input/output (I/O) devices, some of which must transfer large volumes of data (e.g., video data) in relatively short periods of time. A computer system must manage the competition of these I/O devices and other functional units for shared data resources, while at the same time assure that the real-time data transfer constraints of the I/O devices and other processor components are satisfied.

Data is communicated among various computer components and peripheral devices over computer buses. A bus may be incorporated onto the microprocessor chip in order to connect the CPU, various caches and peripheral interfaces with each other and ultimately to main memory through an on-chip interface. Buses may also be external to the microprocessor chip, connecting various memory and I/O units and/or processors together in a multiprocessor system. For example, processors may utilize memory as a source of data and instructions, and as a destination location for storing results. Processors may also treat I/O devices as resources for communicating with the outside world, and may utilize buses as communication paths between themselves and memory or I/O devices.

When a bus agent (a device connected to the bus, such as a CPU) wishes to communicate with another agent, the first agent sends signals over the bus that cause the second agent to respond. These signals are collectively called the address or identity. The agent that initiates the communication is called the master, and the agent that responds is called the slave. Some agents act only as masters, some only as slaves, and others as either masters or slaves. If the master's addressing of the slave is acknowledged by the slave, then a data transfer path is established.

Only one agent at a time may communicate over the bus. When two agents attempt to access the bus at the same time, an arbitration mechanism or protocol must decide which agent will be granted access to the bus. Conventional bus arbitration schemes generally implement a fixed, unchanging priority assignment among the agents. Each agent is assigned a unique priority that remains the same after each round of arbitration. Under this scheme, low priority devices may rarely be granted bus control if they must frequently contend with higher priority devices during each arbitration attempt. This unfairness can be resolved by implementing a round-robin arbitration scheme in which an agent that wins arbitration is reassigned to a very low priority after being granted bus access, thus removing that agent from competition with previously lower priority agents for a period of time.

Some computer systems, at least in multiprocessor technology, implement a mixed arbitration scheme in which bus agents are divided into classes, with each class having a different priority. Devices within a class have the same priority and are generally scheduled to access the bus in a round-robin, equal opportunity manner. Devices that require a high bandwidth and low latency (waiting period between request and grant of bus control) must be assigned to an appropriate priority class to guarantee that the devices are allocated a minimum bandwidth and maximum latency. Although this mixed arbitration scheme is relatively sophisticated, assuring the proper allocation of bus bandwidth using this technique is cumbersome and inflexible. A more flexible system that could more easily be customized to the bandwidth requirements of a particular configuration is desired.

SUMMARY OF INVENTION

The present invention provides a method and apparatus for bus arbitration with weighted bandwidth allocation. Each bus agent is assigned a weight that governs the percentage of bus bandwidth allocated to the agent. An agent is granted control of the bus based, at least in part, upon its weight. The weight corresponds to the number of arbitration states assigned to the agent, where each state represents a grant of bus control. If a first agent is assigned a weight W and all agents together are assigned a total weight Z, an arbiter of the present invention guarantees bus control to the first agent for at least W arbitrations out of Z arbitrations in which the first agent requests bus control. By employing this scheme, the first agent is guaranteed a fraction W/Z of the bus bandwidth. To ensure flexibility of bandwidth allocation, the weight may be programmed using conventional memory-mapped techniques.

The arbitration scheme of the present invention can be split into multiple levels of hierarchy, where arbitration at each level is controlled by an independent state machine. When an agent wins arbitration at one level, it is passed to the next higher level where it competes with other agents at that level for bus access. For example, if a first agent occupies a corresponding second level, level 2, and wins arbitration at the second level, then the first agent will contend for arbitration at a first level, level 1, above level 2. The first agent and all other level 2 agents are assigned level 2 priorities and weights. To win arbitration at level 2, the first agent must have the highest level 2 priority among the level 2 agents asserting requests. In general, if the first agent occupies a corresponding kth level and is assigned a kth level weight, then the first agent is granted control of the bus based, at least in part, upon $W_k$. In particular, where all agents together at the kth level are assigned a total weight $Z_k$, the first agent is guaranteed bus control for at least $W_k$ arbitrations out of $Z_k$ arbitrations in which the first agent requests bus control and a kth level agent wins bus control. The weight $W_k$ corresponds to $W_k$ arbitration states at the kth level out of a total of $Z_k$ arbitration states at the kth level. This scheme guarantees a fraction $W_k/Z_k$ of the bandwidth at level k to the first agent.

If the first agent wins level 2 arbitration, then it is passed on to level 1 as the level 2 winning agent. At level 1, the level 2 winning agent and all other level 1 agents are assigned level 1 priorities and weights. The level 1 priority and weight assigned to the level 2 winning agent are not assigned to the particular level 2 agent that wins an arbitration round, e.g., the first agent, but to the class of level 2 agents that are passed on to level 1. If the level 2 winning agent has a highest level 1 priority among level 1 agents asserting requests, then the level 2 winning agent wins arbitration at level 1 and is granted control of the bus.

The present invention also allows a bus agent to raise the priority of its request based upon the urgency of the request. According to the present invention, a bus agent can indicate the priority of its request to be low or high. When a bus agent wants to initiate a data transfer, it initially posts an adjustable low priority request. If the request is not acknowledged after the expiration of a predetermined waiting period, then the agent raises the request to a high priority request. Generally, the worst case latency period in which the high priority request will be acknowledged is known for a particular computer system. Accordingly, the waiting period is selected so that the agent will be guaranteed access to the bus within the worst case latency period after asserting a request. This priority raising technique of the present invention can be incorporated into any arbitration scheme, and in particular to the weighted arbitration scheme described above.

BRIEF DESCRIPTION OF THE DRAWINGS

The objects, features and advantages of the present invention will be apparent to one skilled in the art in light of the detailed description in which the following figures provide examples of the structure and operation of the invention.

DETAILED DESCRIPTION OF THE INVENTION

The present invention provides a bus arbitration scheme that flexibly allocates bus bandwidth to bus agents. In the following description, numerous details are set forth in order to enable a thorough understanding of the present invention. However, it will be understood by those of ordinary skill in the art that these specific details are not required in order to practice the invention. Further, well-known elements, devices, process steps and the like are not set forth in detail in order to avoid obscuring the present invention.

Figure 1:
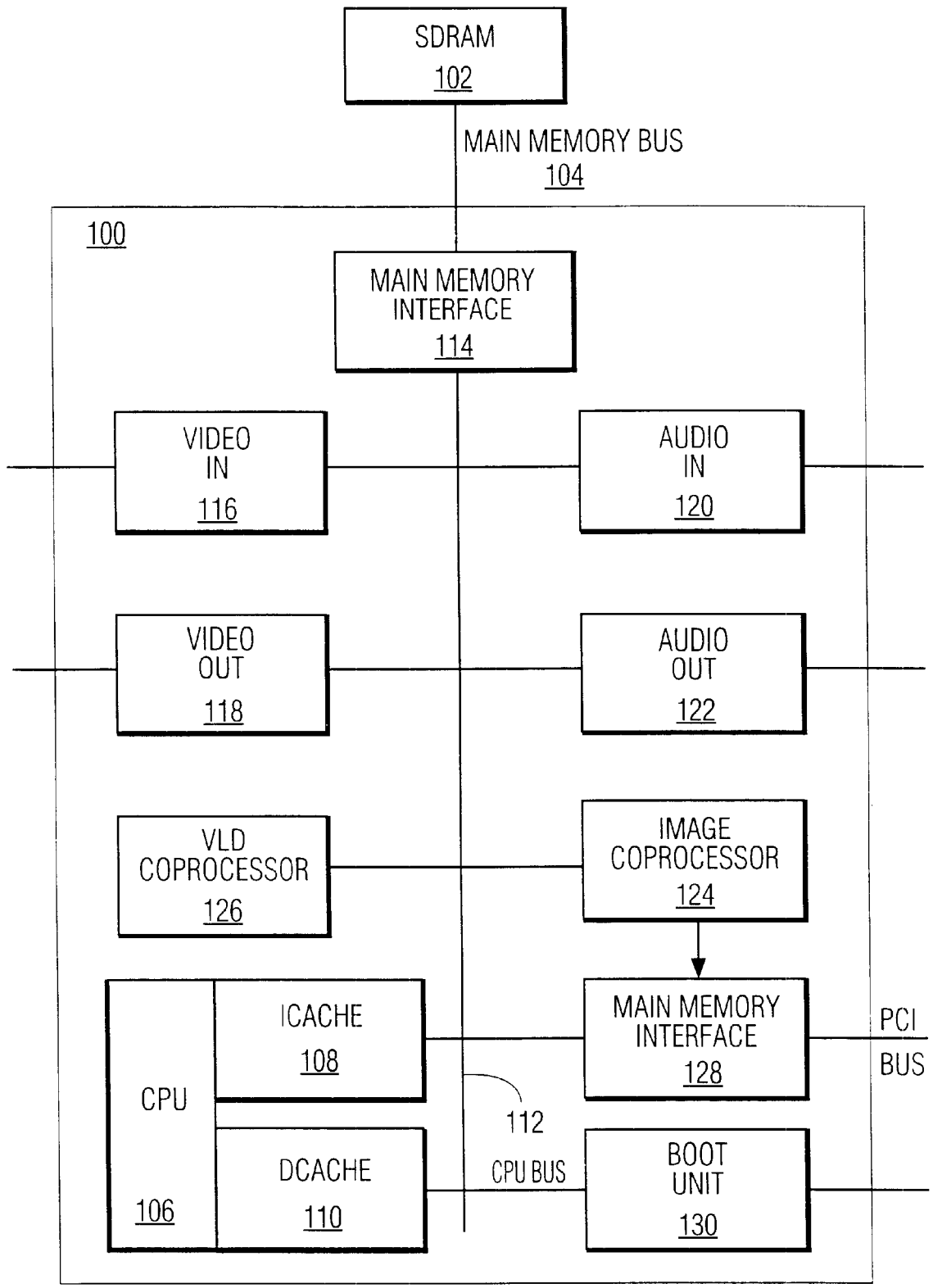
FIG. 1 illustrates a computer system incorporating the arbitration scheme of the present invention.

FIG. 1 illustrates the major functional blocks of one embodiment of a computer system incorporating the arbitration scheme of the present invention. A microprocessor chip 100 is coupled to a main memory device 102 over a main memory bus 104. The main memory 102 may be implemented as a synchronous DRAM (SDRAM). The microprocessor chip 100 includes a central processing unit (CPU) 106 that incorporates an instruction cache 108 and a data cache 110. The CPU 106 and its respective caches communicate with other on-chip components over an internal CPU bus 112. A main memory interface 114 controls the arbitration of various on-chip functional units for control of the internal bus 112, and coordinates the transfer of data between the internal bus 112 and the main memory 102.

A number of the on-chip units provide I/O interfaces employed in multimedia processing. A video input unit 116 receives off-chip video data that can be transferred for storage into the main memory 102 through the bus 112 and the main memory interface 114. A video output unit 118 is responsible for the transfer of video data out of the chip 100 to external I/O units, such as a video display (not shown). Similarly, an audio input unit 120 handles the transfer of audio data into the chip 100, whereas an audio output unit 122 coordinates the transfer of audio data from the chip 100 to an off-chip audio unit, such as a sound card (not shown).

The microprocessor further includes an image co-processor 124, which is dedicated to performing complex image processing tasks that would otherwise occupy the CPU 106 for long periods of time. A VLD (Variable Length Decoder) co-processor 126 is used to speed up computation of the MPEG algorithm preferably employed to decompress video data. Further, a PCI (Peripheral Component Interconnect) interface unit 128 permits the on-chip units to be coupled to a PCI bus. Finally, boot unit 130 loads main memory 102 with a boot routine from an external EPROM upon power-up or reset.

Figure 2:
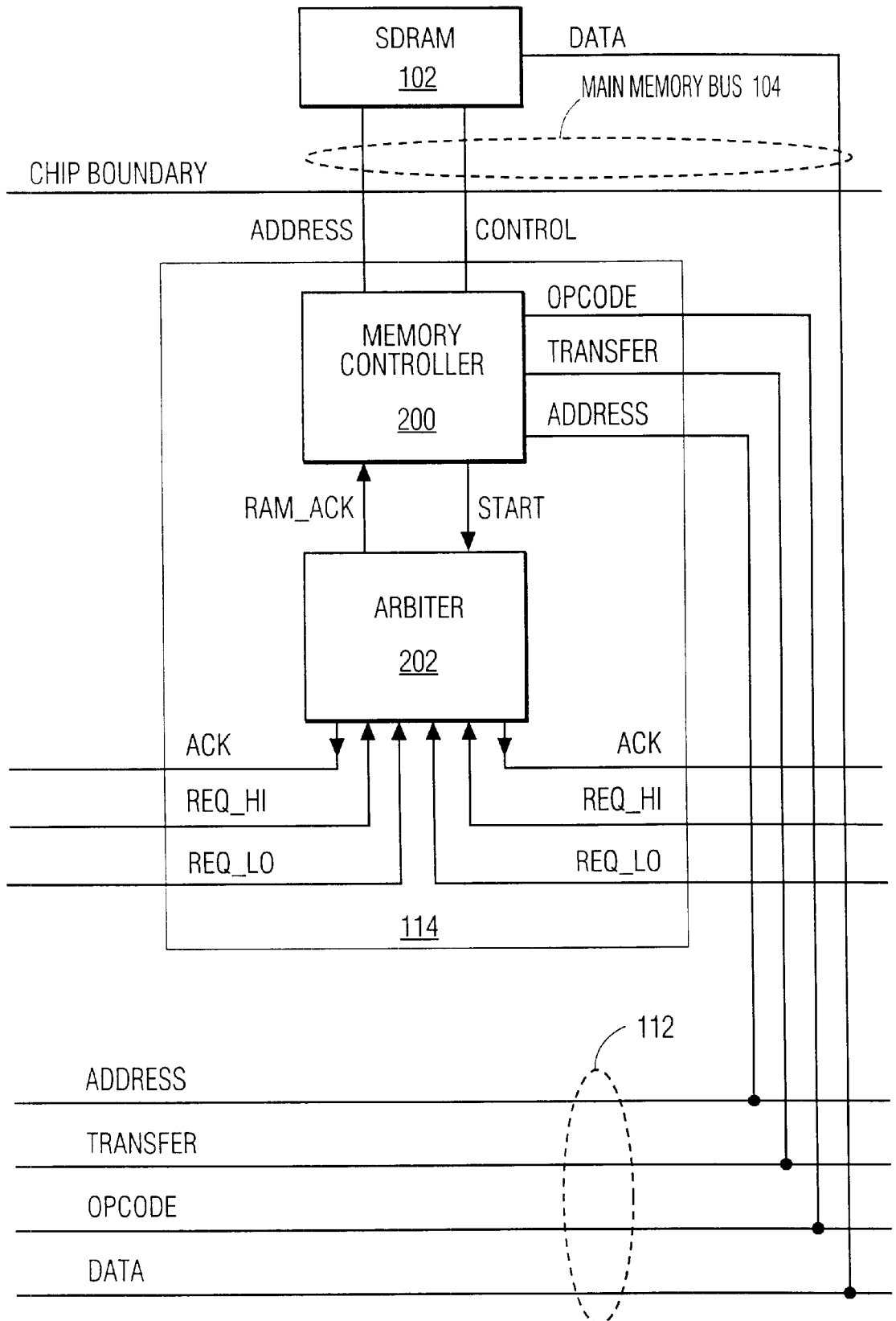
FIG. 2 is a functional block diagram of the main memory interface of the present invention.

FIG. 2 illustrates a functional block diagram of the main memory interface 114. The main memory interface 114 includes a memory controller 200 and an arbiter 202. The arbiter 202 determines which bus agent that contends for access to the internal CPU bus 112 will be granted control of the bus 112. The memory controller 200 coordinates the transfer of data between that agent and other bus agents or the main memory 102.

General Protocol

The general protocol employed by the present invention to perform a main memory transfer over the internal bus 112 may be described, in one embodiment, as follows:

1. A bus master asserts a request for control of the bus 112. As described below, the present invention employs two request signals: a high priority request REQ_HI and a low priority request REQ_LO. The memory controller 200 issues a START signal to indicate that it is ready to initiate a transfer, which requires the arbiter to perform an arbitration.

2. In the same cycle or later, the arbiter 202 responds to the bus master by asserting an acknowledgment signal ACK. This signal indicates that the internal bus 112 is available to the requester and that the request will be handled. If the bus is occupied, the acknowledgment will be delayed. Similarly, the arbiter 202 asserts a RAM_ACK signal to the memory controller 200 after a request has been received and successfully arbitrated.

3. The requester responds to the ACK signal by transmitting an address over a tri-state address bus that is shared with all other bus agents. The address indicates the main memory address associated with the transfer. Simultaneously, the requester indicates the type of transfer (read or write) using a tri-state opcode bus that is also shared with all other bus agents. The arbiter 202 deasserts ACK in this cycle.

4. After deassertion of ACK, the requester deasserts the request signal, while the address and opcode signals remain asserted until a transfer signal is asserted.

5. After a main memory latency period, the memory controller 200 asserts the transfer signal. The transfer signal may come one cycle after the ACK signal or it may come later.

6. One cycle after transfer, the first word of a block of data is transferred over the data bus between the bus agent and the main memory 102. In this cycle, all control signals are deasserted, and the address and opcode buses are tri-stated.

7. In subsequent cycles a sequence of word transfers occurs to complete the rest of the block transfer between the bus agent and the main memory 102. The block size is constant and hard-coded in the design of the memory controller 200 and the bus agents. The transfer order is provided by the signal opcode (read or write). Accordingly, both the bus agent and the memory controller 200 are informed of the block size and the transfer order, so no further handshaking is necessary to complete the bus transaction.

The protocol for coordinating memory-mapped I/O transfers is essentially the same as that for main memory transfers. An example of a memory-mapped I/O transfer is a transfer between the data cache 110 and a control register in the video input unit 116. For memory-mapped I/O, the memory controller 200 asserts an MMIO signal (not shown) after ACK to indicate to all devices on the bus 112 that an MMIO transaction is starting. After MMIO is asserted, every MMIO device inspects the address on the bus 112 to determine whether it is being addressed. The addressed device asserts an MMIO REPLY signal (not shown) to the arbiter to indicate that it is ready to complete the MMIO transfer.

Priority Raising

With this background in place, the priority raising function of the present invention will now be described. Generally, the best CPU performance is obtained if cache misses take priority over I/O traffic on the internal bus 112. However, cache priority must be balanced against the competing real-time constraints of the I/O units. For example, a video output device must be granted control of the bus within a maximum, worst case latency period in order to provide a high quality image to an external display.

Figure 3:
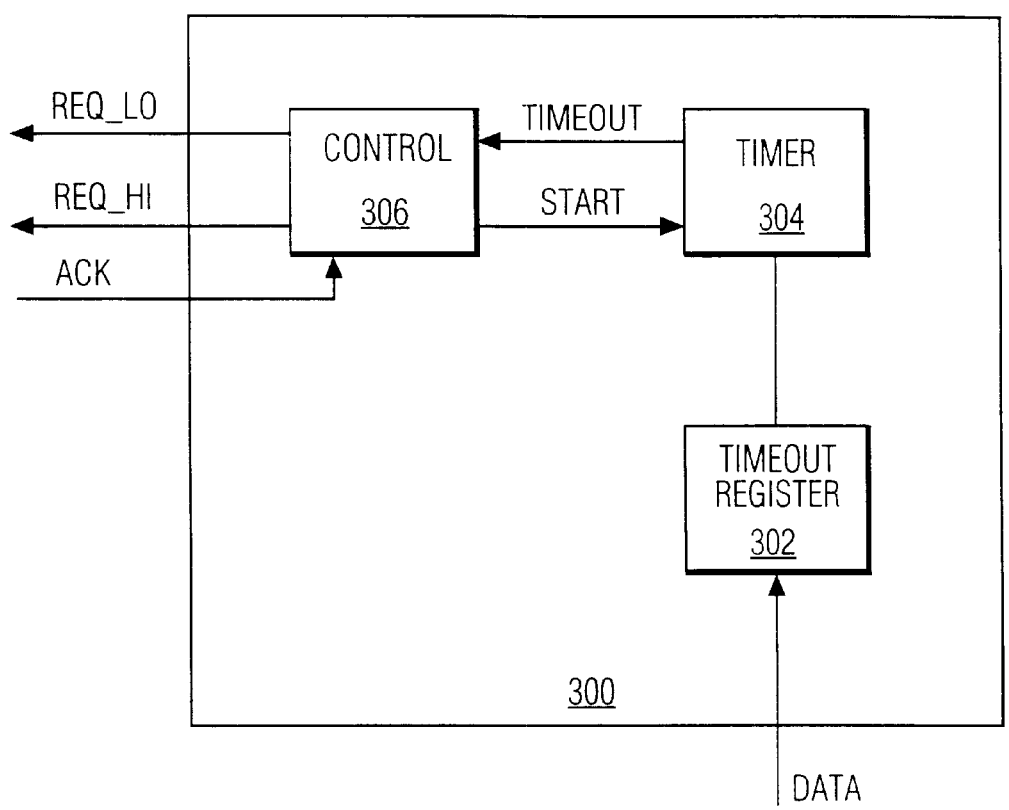
FIG. 3 illustrates the major functional blocks of a bus agent for performing the priority raising function of the present invention.

FIG. 3 illustrates the major functional blocks of a bus master 300 for performing the priority raising function of the present invention. The relevant blocks in the bus master 300 include a time-out register 302, a timer circuit 304 and a control logic circuit 306. The time-out register 302 stores a time-out value. The time-out register 302 can store a fixed time-out value or be programmed according to conventional memory-mapped techniques.

An I/O device or other unit in the computer system of the present invention can indicate the priority of its requests to be low or high. Cache requests and urgent I/O requests, such as from the image co-processor, should be assigned a high priority. Less urgent I/O requests should be assigned a low priority. When a low priority bus agent 300 wants to initiate a data transfer, the control unit 306 initially posts an adjustable low priority request REQ_LO. The control unit 306 simultaneously issues a start signal to the timer 304 to start a countdown of the timer 304. The time-out or waiting period stored in the time-out register is chosen so that the agent 300 will be guaranteed access to the bus within the worst case latency period after asserting a request. The time-out period is typically expressed in processor clock cycles, and is selected as the worst case latency period less the worst case waiting time for a high priority request to win arbitration.

If no acknowledgment from the arbiter 202 has been received within the time-out period, then the timer 304 issues a time-out signal to the control unit 306. In response, the control unit 306 raises the request to a high priority request REQ_HI. Generally, in an arbitration scheme such as round-robin, agent 300 will then win arbitration over other high priority devices. The other devices typically will have been granted bus access more recently than agent 300, thereby causing them to be rotated to lower priorities than agent 300 according to the round-robin algorithm. Further, a high priority request from agent 300 will, of course, win arbitration over a low priority request. Priority raising therefore guarantees bus access to agent 300 within the worst case latency period.

Figure 4:
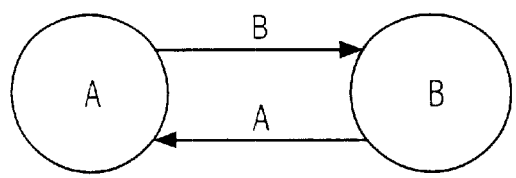
FIG. 4 is a state diagram illustrating conventional round-robin arbitration.
Figure 5:
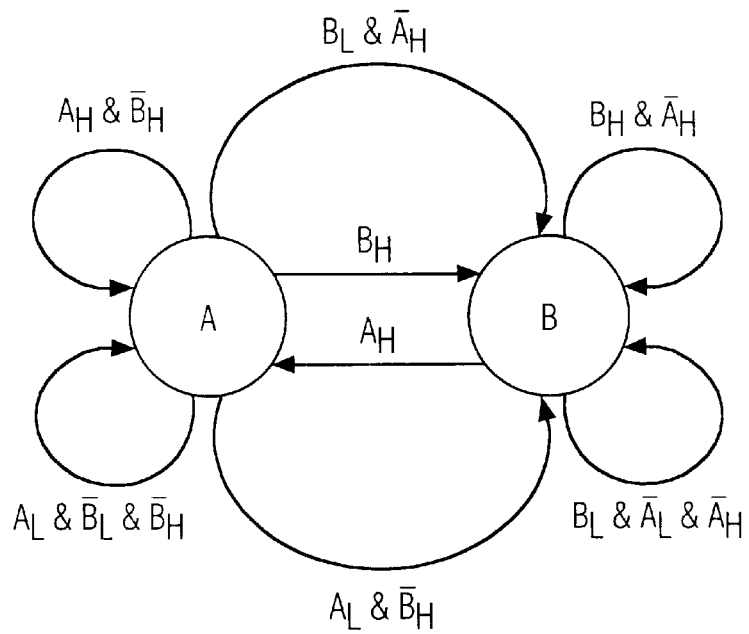
FIG. 5 illustrates the incorporation of the priority raising function of the present invention into the round-robin arbitration of FIG. 4.

Priority raising can be incorporated into any arbitration scheme. For example, FIGS. 4 and 5 illustrate priority raising in round-robin arbitration. FIG. 4 diagrams conventional round-robin arbitration. In state A, bus agent A has control of the bus, whereas in state B, bus agent B has control. The arc from state A to state B indicates that when agent A owns the bus, and a request from agent B is asserted, then a transition to state B occurs, i.e., ownership of the bus passes from agent A to agent B. When the arbitration is in state A and agent A asserts a request while agent B does not, then agent A retains control of the bus. When the arbitration is in state A and both agents A and B assert requests, then ownership of the bus transfers to agent B, creating fair allocation of ownership.

Arbitration state transitions for the round-robin scheme or any other scheme can be viewed in terms of priorities. Referring to FIG. 4, when in state A, agent B has a higher round-robin priority than agent A, i.e., if both A and B assert requests, then ownership passes to B. After the transition, the agent (B) granted control is rotated to the lowest round-robin priority in the priority order. As a result, A now is assigned the highest round-robin priority, and A will gain control of the bus if both A and B assert requests. In this manner, the round-robin scheme can be viewed as rotating the round-robin priority order after each arbitration.

FIG. 5 illustrates the incorporation of priority raising into the simple round-robin example of FIG. 4. Assume that bus agent A is assigned a fixed high priority. For example, bus agent A may be an instruction cache or a data cache, which should have a minimum latency in order to achieve optimum CPU performance. Further, assume that bus agent B is an I/O device that incorporates priority raising circuitry, as shown in FIG. 3.

Referring to FIG. 5, if A has control of the bus and B asserts a low priority request while A does not assert a request, then B wins the arbitration and is granted control of the bus. However, if A has control and B asserts a low priority request while A asserts its high priority request, then A is again granted control of the bus. This situation may continue for many arbitration cycles, essentially shutting out B from access to the bus. According to the priority raising mechanism, after a predetermined waiting period, B will raise its request to a high priority request. At that time A and B will compete equally in the round-robin scheme, and control will pass to B even if A is simultaneously asserting a high priority request.

Based on this example, it can be seen that, in general, agent A wins arbitration if it asserts a high priority request while agent B asserts a low priority request. If both A and B assert requests of the same priority, then arbitration is resolved in the conventional manner. Looked at another way, agent B wins arbitration if both agents A and B assert high priority requests and agent B would have won arbitration if both A and B were asserting low priority requests.

Weighted Round-Robin Arbitration

Priority raising is but one technique employed in the arbitration scheme of the present invention. In addition, or as an independent alternative, the present invention modifies the conventional round-robin scheme to account for the fact that the bandwidth and latency requirements of the bus agents differ. As discussed above, the caches should be allocated the greatest share of bus bandwidth, and thus the minimum latency, because the best CPU performance is obtained if cache misses are given the highest priority access to the bus. In contrast, an audio device operates at a relatively low bandwidth and can wait a relatively long time for a data transfer.

Figure 6:
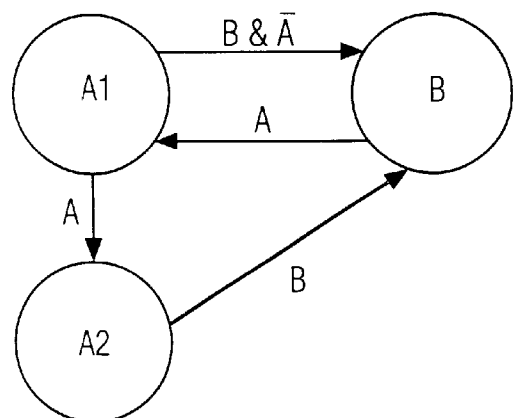
FIG. 6 is a state diagram illustrating weighted round-robin arbitration according to the present invention.

According to another embodiment of the present invention, the bus agent priorities are weighted so that the agents may be allocated unequal shares of bandwidth during round-robin arbitration. FIG. 6 is a state diagram illustrating weighted round-robin arbitration in which bus agent A is allocated twice as much bandwidth as bus agent B. According to the usual round-robin scheme, bus agent A would be reassigned to a low (preferably the lowest) round-robin priority after winning a first round of arbitration. However, in the example of FIG. 6, bus agent A is assigned a weight of 2. This double weight indicates that bus agent A can retain its high priority status for a total of two arbitration rounds out of the three rounds represented by the three state transition nodes A1, A2 and B. Accordingly, after bus agent A wins the first round of arbitration (state A1), then bus agent A would win a second round of arbitration if A again requests access to the bus (state A2). If, however, during this second round, A does not request bus access but B does, then bus agent B would win the second round of arbitration. Because A is only assigned a weight of 2, then after state A2 (in which A has won arbitration for two rounds), B would win the next arbitration round if B requests bus access. In general, if the total weight assigned to all bus agents is Z, then a bus agent having a weight W will be assigned the highest priority for at least W arbitration rounds out of Z arbitration rounds in which the agent requests bus access.

Figure 7:
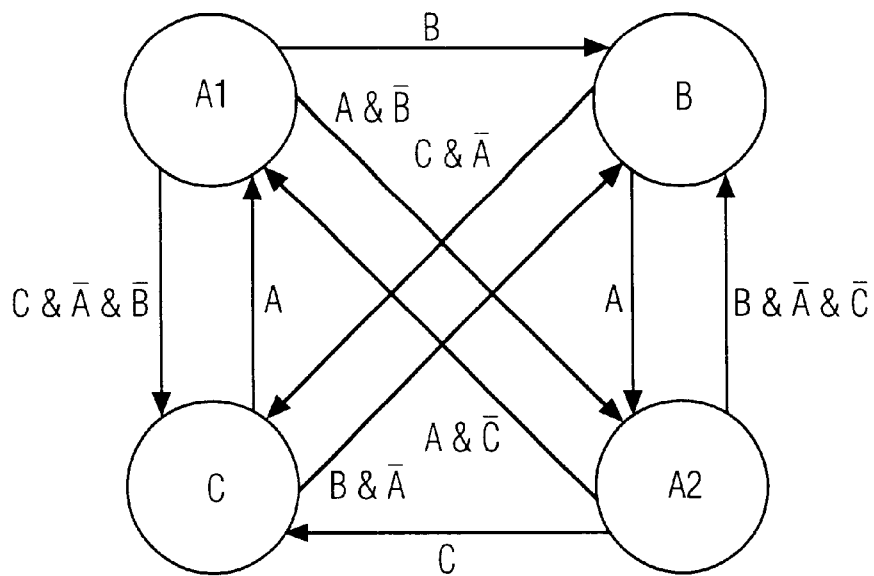
FIG. 7 is a state diagram illustrating another embodiment of weighted round-robin arbitration according to the present invention.

FIG. 7 is a state diagram illustrating a more complicated implementation of the weighted round-robin arbitration scheme of the present invention. The bus agents A, B and C are proportionately weighted according to the ratio 2:1:1. Assuming that all agents are requesting bus access, the state transition sequence is A1, B, A2, C. Here, the total weight Z=4. Because of this weighting, agent A can retain the highest priority for at least two out of four arbitration rounds in which A requests bus control.

Figure 8:
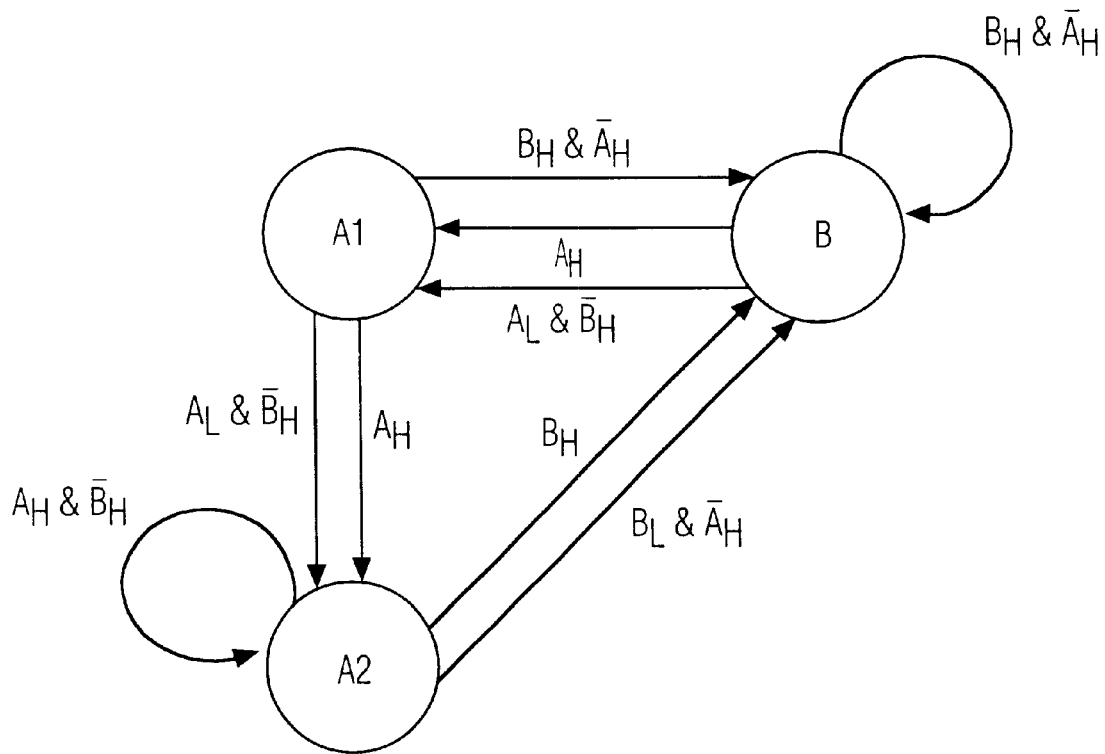
FIG. 8 illustrates the incorporation of priority raising into the weighted round-robin arbitration of FIG. 6.

Weighted round-robin arbitration can be combined with the priority raising feature of the present invention. FIG. 8 illustrates priority raising incorporated into the weighted round-robin arbitration of FIG. 6. In the case of FIG. 6, where the agents can assert only a single-level priority, if both A and B assert requests starting at state A1, then A wins the arbitration through a transition to state A2. However, according to FIG. 8, if one of the agents asserts a high priority request (after raising it from an adjustable low priority) and the other agent asserts either no request or a low priority request, then the high priority requesting agent wins the arbitration round. For example, starting at state A1, B wins the arbitration if B raises its adjustable low priority request to a high priority request ($B_H$) and A asserts either no request or a low priority request ($A_L$). Similarly, at state A2 if A issues a high priority request ($A_H$) and B issues either no request or a low priority request ($B_L$), then A remains at state A2, even though under the round-robin scheme of FIG. 6 arbitration would have transitioned to state B. In the case where both A and B assert requests of the same priority level, arbitration follows the state transition diagram of FIG. 6. Further, an agent asserting even a low priority request, of course, wins arbitration if no other agent asserts any request at all.

Arbitration Hierarchy

Figure 9:
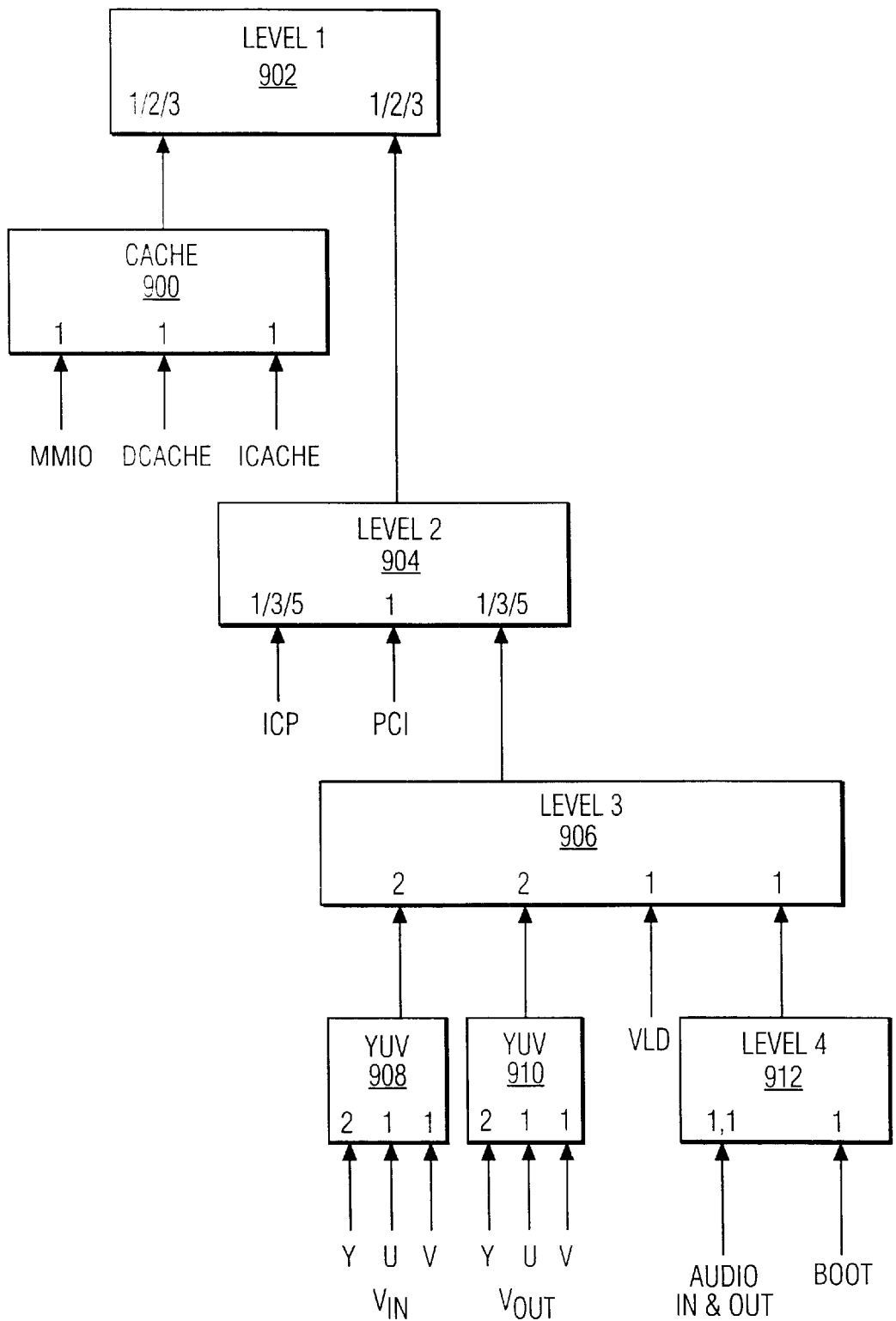
FIG. 9 illustrates hierarchical arbitration according to the present invention.
Figure 10:
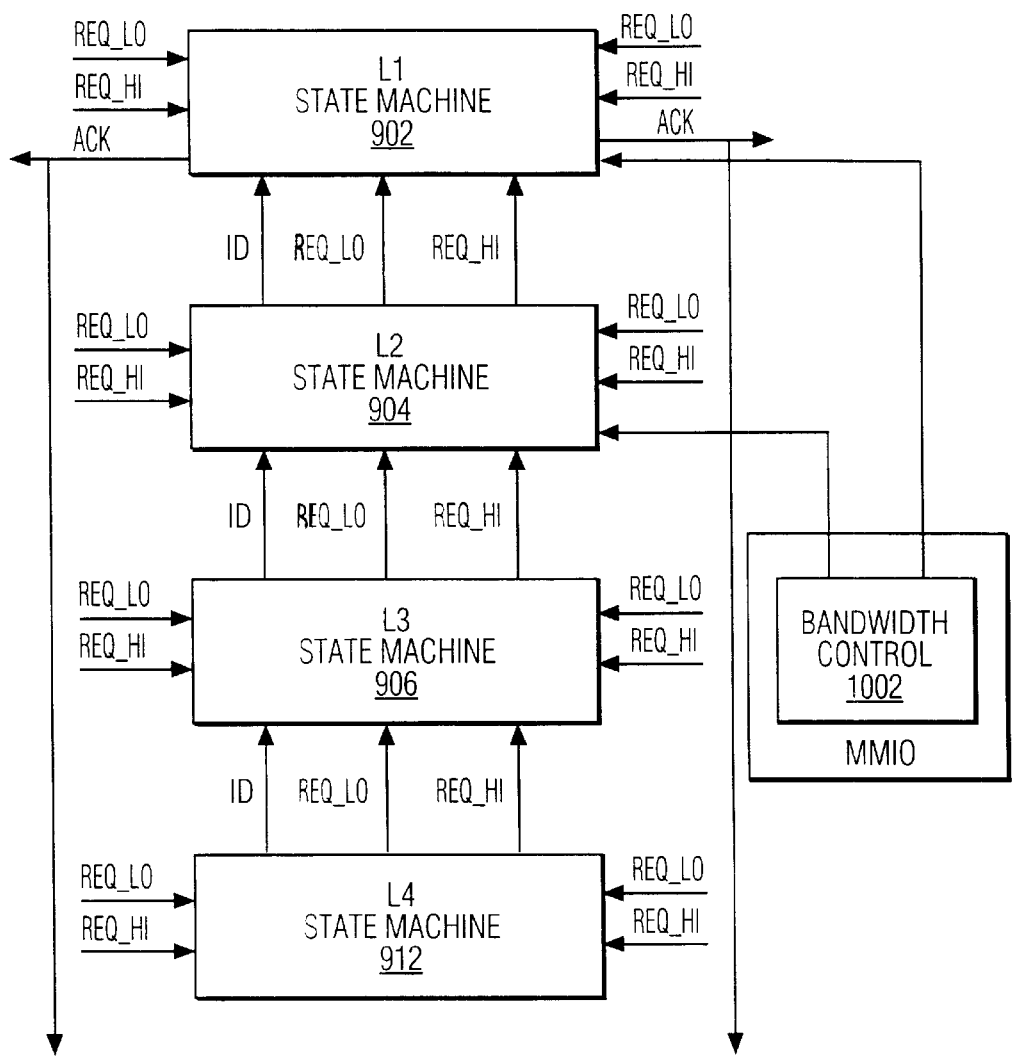
FIG. 10 is a more detailed illustration of hierarchical arbitration according to the present invention.

The arbitration scheme of the present invention can be split into multiple levels of hierarchy, as shown in FIG. 9. Each level of hierarchy constitutes an independent arbitration state machine, as generally illustrated in FIG. 10. When a device wins arbitration at one level, it is passed to the next level where it competes with other devices at that level for bus access. This process is continued until the highest level of arbitration, where an agent ultimately wins control of the bus.

FIG. 9 illustrates an example of a weighted round-robin, four-level arbitration hierarchy according to the present invention. Each device of FIG. 1 is assigned to a hierarchical level and weighted within its assigned level. Memory-mapped I/O (MMIO), data cache and instruction cache devices preferably are arbitrated with fixed weights among each other (i.e., 1) under control of a cache arbiter 900. Preferably, each of these devices can only issue a high priority request REQ_HI. At level 1 902, the winner of the cache arbitration is assigned a programmable weight of 1, 2 or 3. The winner of the cache arbitration contends for the bus at level 1 900 with the winner of level 2 arbitration, the level 2 winner having a programmable weight of 1, 2 or 3 at level 1 902. The requests surviving the level 2 arbitration can have a low or high priority.

Level 2 904 contains the image co-processor (ICP) 124 and the PCI bus interface 128. The image co-processor 124 preferably is assigned a programmable weight of 1, 3 or 5, whereas the PCI bus is assigned a weight of 1. These devices contend with the winner of level 3 arbitration. At level 2, the level 3 arbitration winner is preferably assigned a programmable weight of 1, 3 or 5.

Level 3 906 contains high-bandwidth video devices: video-in 116, video-out 118 and the VLD co-processor 126. The YUV video components of the video-in signal contend for arbitration in a round-robin YUV arbiter 908. Similarly, the YUV components of the video-out signal contend for arbitration in a round-robin YUV arbiter 910. The Y video component is preferably assigned a weight of 2 because it carries the most video information, whereas the U and V components are each assigned a weight of 1. Each combined YUV signal has a weight of 2 at level 3 906. The video devices contend at level 3 with the winner of level 4 arbitration, which is assigned a level 3 weight of 1.

Level 4 912 contains low-bandwidth devices, including the audio units 120 and 122 and the boot unit 130. The audio units and the boot unit are each preferably assigned weights of 1.

FIG. 10 illustrates a portion of the arbitration hierarchy of FIG. 9 in greater detail. The arbitration at each level is implemented in a state machine. If programmable weighting is employed at a particular level, then arbitration at that level should be implemented using a programmable state machine. Programmable state machines are well known in the art, and may be embodied in a programmable logic array (PLA) or a similar device. If fixed weighting is desired, then fixed logic may be utilized also. Arbitration weights are assigned by giving a device a number of state nodes in the arbitration state machine equal to the weight of the device. For programmable weights, nodes in the state machine may be activated or deactivated.

According to the example of FIGS. 9 and 10, a significant variation in bandwidth that would require programmable weighting is only anticipated for the device types at the first two levels. Adequate performance can be achieved by employing fixed weights for the third and fourth levels. Those skilled in the art will understand that the programmable or unprogrammable nature of the state machines can be varied in design to accommodate different expectations of variation in bandwidth.

The weights, and thus the bandwidth, of devices at the first and second levels can be programmed by writing the desired weights into a memory-mapped bandwidth control register 1002. In this example, the bandwidth control register 1002 contains four fields to select the weights for the two respective winners of the cache arbitration and the level 2 arbitration at level 1 902, the weight of the image co-processor at level 2 904, and the weight at level 2 904 of the winner of the level 3 906 arbitration. As mentioned above, changing the weight of a device activates or deactivates nodes in the state machine. For example, the weight of agent A in FIG. 6 would be changed from 2 to 1 by deactivating node A2, which would result in the state diagram of FIG. 4.

FIG. 10 also illustrates that the request lines to each state machine are generally divided into high and low priority requests. A device identification number identifying the device winning a lower level arbitration is passed to the next level along with the high or low priority request from that device. Note that not all the request lines shown in FIG. 9 are detailed in FIG. 10.

In general, each of the state machines of FIG. 10 preferably performs weighted round-robin arbitration with priority raising. When an agent wins arbitration at one level, it is passed on to the next higher level to contend for arbitration at that level. For example, the image co-processor 124 contends for arbitration at level 2 904 with PCI interface 128 and the winner of the level 3 arbitration. The level 2 state machine 904 must consider a number of factors to determine whether the image co-processor 124 wins level 2 arbitration: the round-robin priority at level 2 of the image co-processor 124 compared to the level 2 round-robin priority of other level 2 agents issuing requests; and whether the image co-processor 124 is asserting an adjustable low or high priority request according to the priority raising technique of the present invention. If, after considering these factors, the level 2 state machine 904 determines that the image co-processor 124 wins arbitration at level 2, then the image co-processor 124 request is presented to the level 1 state machine 902 as the request of the level 2 winning agent.

At level 1 902, the level 2 winning agent contends for arbitration with the winner of the cache arbitration. To determine whether the level 2 winning agent wins arbitration at level 1, the level 1 state machine 902 must consider the following factors: the round-robin priority of the level 2 winning agent at level 1 compared to the level 1 priority of the winner of the cache arbitration; and whether the level 2 winning agent is asserting an adjustable low priority or high priority request according to priority raising. The winner of the level 1 arbitration will be granted control of the bus. It is important to note the distinction between winning arbitration at a particular level and ultimately being granted control of the bus, which only occurs upon winning level 1 arbitration.

In this example, if the image co-processor 124 is granted control of the bus, then at the "home" level 2 904 the level 2 state machine 904 will experience a transition to the next state during the next round of arbitration. At level 2 904, the image co-processor 124 occupies $W_2$ state transition nodes out of $Z_2$ nodes, where $W_2$ is the level 2 weight of the image co-processor 124 and $Z_2$ is the total level 2 weight of all the devices at level 2. Assuming no priority raising for the sake of this example, this configuration guarantees bus control to the image co-processor 124 for at least $W_2$ arbitrations out of $Z_2$ arbitrations in which the image co-processor 124 requests bus control and a level 2 agent wins bus control.

At level 1, the granting of bus control to the level 2 winning agent also causes the level 1 state machine 902 to experience a transition to the next state. The level 2 winning agent occupies $W_1$ state transition nodes out of $Z_1$ nodes at level 1, where $W_1$ is the level 1 weight of the level 2 winning agent and $Z_1$ is the total level 1 weight of all devices at level 1. This configuration guarantees bus control to the level 2 winning agent for at least $W_1$ arbitration rounds out of $Z_1$ rounds in which the level 2 winning agent requests bus control.

It is important to note that the level 2 winning agent refers to the class of level 2 agents at level 1 that win level 2 arbitration, and not to the individual level 2 agent that happens to win a particular arbitration round. It is the level 2 input to the level 1 902 state machine that experiences a transition in the level 1 902 state machine, and not just the particular level 2 agent that happens to win an arbitration round, e.g., the image co-processor 124.

Bandwidth Allocation

Bandwidth is allocated at every level relative to the weights of the devices. The fraction of bandwidth of a device x is:

$$F_x = W_x/Z_L,$$

where $W_x$ is the weight of device x, and $Z_L$ is the sum of the weights of all devices at the level L where the device x resides. For example, level 4 occupies ⅙th of the bandwidth of level 3.

The guaranteed minimum bandwidth for device x is:

$$B_x = F_x \times B_L,$$

where $B_L$ is the total bandwidth available at level L.

The expected available bandwidth for a device differs from the guaranteed minimum bandwidth, depending on the application. If a particular device does not use all of its bandwidth, then other devices at the same level will get correspondingly more bandwidth. If bandwidth is not all used at a level, then higher levels will be able to employ more bandwidth.

Minimum bandwidth is closely related to maximum latency. The maximum latency $L_x$ for device x is:

$$L_x = \mathrm{ceil}(Z_L/W_x) \times (B_{tot}/B_L - 1) \times T \text{(clock cycles)},$$

where $B_{tot}$ is the total bus bandwidth, ceil is the ceiling or next highest integer function, and T is the transfer time of one transaction (T=16 cycles if main memory bandwidth is four bytes per cycle and the transfer size is 64 bytes).

Note that expected latency is normally much lower than the worst case maximum latency because rarely do many devices issue requests at exactly the same time.

Given the number of factors involved, the programming of the arbitration weights is best performed by first assuming different sets of weights and determining the resultant bandwidths for the corresponding devices. Then, the optimum set of weights is selected based upon the corresponding resultant bandwidths that most closely match the desired bandwidth allocation. For example, assume a computer system having 400 MB/s main memory bandwidth and a transfer time of T=16 cycles. Further assume a 1:1 bandwidth weighting at level 1, and a 1:1:1 bandwidth weighting at level 2. The remainder of the bandwidth weighting follows the fixed weighting scheme of FIG. 9. This weighting results in the following bandwidth allocation to the different levels of hierarchy:

Level 1: 200 MB/s

Level 2: 133 MB/s

Level 3: 56 MB/s
Level 4: 11 MB/s
For some individual devices, bandwidth and latency are as follows:
MMIO
   (Assume no instruction or data cache misses)
   Bandwidth=½×400=200 MB/s
   Maximum latency=(2/1−1)×16=16 cycles
Instruction cache, data cache
   (Assume only one cache miss, no MMIO accesses)
   Bandwidth=½×400=200 MB/s
   Maximum latency=(2/1−1)×16=16 cycles
Image Co-processor
   (Assume all units issue requests at maximum rate)
   Bandwidth=⅓×200=66 MB/s
   Maximum latency=(3/1×400/200−1)×16=80 cycles
VLD
   (Assume all units issue requests at maximum rate)
   Bandwidth=⅙×⅓×200=11 MB/s
   Maximum latency=(6×400/67−1)×16=560 cycles
Audio
   (Assume all units issue requests at maximum rate)
   Bandwidth=⅓×⅙×⅓×200=3.7 MB/s
   Maximum latency=(3/1×36−1)×16=1,712 cycles As an example, Table 1 illustrates percentage bandwidth allocation among caches and peripheral units at level 1. Table 2 illustrates bandwidth allocation among the image co-processor, the PCI interface and the winner of the level 3 arbitration.

TABLE 1

Bandwidth allocation among caches and peripheral units.

| weight of MMIO and caches | weight of level 2 | bandwidth at level 1 | bandwidth at level 2 |
|---|---|---|---|
| 3 | 1 | 75% | 25% |
| 2 | 1 | 67% | 33% |
| 3 | 2 | 60% | 40% |
| 1 | 1 | 50% | 50% |
| 2 | 3 | 40% | 60% |
| 1 | 2 | 33% | 67% |
| 1 | 3 | 25% | 75% |

TABLE 2

Bandwidth allocation among ICP, PCI and devices at level 3.

| weight of ICP | weight of level 3 | bandwidth for ICP | bandwidth at level 3 | bandwidth for PCI |
|---|---|---|---|---|
| 1 | 1 | 33% | 33% | 33% |
| 3 | 1 | 60% | 20% | 20% |
| 5 | 1 | 72% | 14% | 14% |
| 1 | 3 | 20% | 60% | 20% |
| 3 | 3 | 43% | 43% | 14% |
| 5 | 3 | 56% | 33% | 11% |
| 1 | 5 | 14% | 72% | 14% |
| 3 | 5 | 33% | 56% | 11% |
| 5 | 5 | 45% | 45% | 10% |

Although the invention has been described in conjunction with a number of embodiments, those skilled in the art will appreciate that various modifications and alterations may be made without departing from the spirit and scope of the invention. For example, although for purposes of explanation the following description provides examples of arbitration for an internal CPU bus, it will be understood by those of ordinary skill in the art that the present invention is generally applicable to the control of any communications bus, as well as to the accessing of any common resource. Further, those skilled in the art will understand the principles disclosed herein are applicable to systems having any number of bus agents, any number of weights per bus agent, any number of hierarchical levels and any number of priority levels for each request.

What is claimed is:

1. A method of arbitrating among at least one agent for control of a bus, the method comprising:
   asserting a request, by a first agent, for control of the bus; and
   granting exclusive control of the bus to the first agent based upon said request, a weight assigned to the first agent that is not dependent on age, and the agent which had control of the bus immediately preceding said request, said weight indicating a number of arbitration rounds that a priority status of the first stale is is retained.

2. The method of claim 1, wherein the first agent is assigned a weight W and all agents together are assigned a total weight Z, the granting step comprising the step of guaranteeing bus control to the first agent for at least W arbitrations out of Z arbitrations in which the first agent requests bus control.

3. The method of claim 1, wherein the first agent is assigned a weight W and all agents together are assigned a total weight Z, the granting step comprising the step of guaranteeing a fraction W/Z of the bus bandwidth to the first agent.

4. The method of claim 1, wherein the weight is programmable.

5. A method of arbitrating among at least one agent for control of a bus, the method comprising the steps of:
   a first agent asserting a request for control of the bus; and
   granting control of the bus to the first agent based upon a weight assigned to the first agent,
   wherein the first agent wins arbitration at a kth level if the first agent has a highest kth level priority among kth level agents asserting requests.

6. The method of claim 5, wherein the first agent wins arbitration at the kth level if the first agent has a highest kth level priority among kth level agents asserting requests.

7. The method of claim 5, wherein the first agent is assigned a kth level weight $W_k$, the granting step comprising the step of:
   granting control of the bus to the first agent based upon $W_k$.

8. The method of claim 7, wherein all agents together at the kth level are assigned a total weight $Z_k$, the granting step comprising the step of guaranteeing bus control to the first agent for at least $W_k$ arbitrations out of $Z_k$ arbitrations in which the first agent requests bus control and a kth level agent wins bus control.

9. The method of claim 7, wherein $W_k$ corresponds to $W_k$ arbitration states at the kth level, all agents together at the kth level are assigned a total weight $Z_k$ corresponding to $Z_k$ arbitration states at the kth level, and each state represents a grant of bus control to a corresponding agent.

10. The method of claim 7, wherein all agents together at the kth level are assigned a total weight $Z_k$, the granting step comprising the step of guaranteeing a fraction $W_k/Z_k$ of the bandwidth at level k to the first agent.

11. The method of claim 5, wherein k-1th level priorities are assigned to k-1th level agents including the kth level winning agent, and the kth level winning agent represents a class of kth level agents at the k-1th level that win kth level arbitration, the method further comprising the step of:
   determining that the kth level winning agent wins arbitration at the k-1th level if the kth level winning agent has a highest k-1th level priority among k-1th level agents asserting requests.

12. The method of claim 11, further comprising the steps of:
a second agent at the k-1th level asserting a request for control of the bus; and
determining that the second agent wins arbitration at the k-1th level if the second agent has a highest k-1th level priority among k-1th level agents asserting requests.

13. A method of arbitrating among at least one agent for control of a bus, the method comprising the steps of:
a first agent asserting a request for control of the bus; and
granting control of the bus to the first agent based upon a weight assigned to the first agent,
wherein a waiting period is selected so that a worst case latency constraint of the first agent is satisfied.

14. The method of claim 13, wherein the waiting period is selected so that a worst case latency constraint of the first agent is satisfied.

15. A method of arbitrating among at least one agent for control of a bus, the method comprising the steps of:
a first agent asserting an adjustable low priority request for control of the bus; and
raising the adjustable low priority request to a high priority request if the adjustable low priority request is not granted after a predetermined waiting period;
wherein a second agent asserts a request, the method further including
determining that the first agent wins arbitration if the first agent asserts a high priority request and a second agent asserts either a low priority request or no request.

16. A method of arbitrating among at least one agent for control of a bus, the method comprising the steps of:
a first agent asserting an adjustable low priority request for control of the bus;
raising the adjustable low priority request to a high priority request if the adjustable low priority request is not granted after a predetermined waiting period;
determining that the first agent wins arbitration if the a first agent asserts a high priority request and a second agent asserts either a low priority request or no request,
wherein the step of determining that the first agent wins arbitration comprises the step of granting control of the bus to the first agent if the first agent asserts a high priority request and the second agent asserts either a low priority request or no request.

17. An arbiter for arbitrating among at least one agent for control of a bus, the arbiter comprising:
at least one request input for receiving a request for exclusive bus control from the at least one agent;
at least one acknowledgment output for indicating that the at least one agent has won arbitration; and
a first state machine for indicating that a first agent has won arbitration based upon said request, a weight assigned to the first agent, and the agent which had control of the bus immediately preceding said request, wherein the first state machine is coupled to the at least one request input and the at least one acknowledgment output.

18. An arbiter for arbitrating among at least one agent for control of a bus, the arbiter comprising:
at least one request input for receiving a request for bus control from the at least one agent;
at least one acknowledgment output for indicating that the at least one agent has won arbitration; and
a first state machine for indicating that a first agent has won arbitration based upon a weight assigned to the first agent, wherein the first state machine is coupled to the at least one request input and the at least one acknowledgment output,
wherein the arbiter grants control of the bus to the first agent if it has a highest priority among agents asserting requests.

19. The arbiter of claim 17, wherein the first agent is assigned a weight W and all agents together are assigned a total weight Z in the state machine circuitry, the first state machine for guaranteeing bus control to the first agent for at least W arbitrations out of Z arbitrations in which the first agent requests bus control.

20. An arbiter for arbitrating among at least one agent for control of a bus, the arbiter comprising:
at least one request input for receiving a request for bus control from the at least one agent;
at least one acknowledgment output for indicating that the at least one agent has won arbitration; and
a first state machine for indicating that a first agent has won arbitration based upon a weight assigned to the first agent, wherein the first state machine is coupled to the at least one request input and the at least one acknowledgment output,
wherein the first agent is assigned a weight W corresponding to W arbitration states, all agents together are assigned a total weight Z corresponding to Z arbitration states, and each state represents a grant of bus control to a corresponding agent.

21. The arbiter of claim 17, wherein the weight is programmable.

22. An arbiter for arbitrating among at least one agent for control of a bus, the arbiter comprising:
at least one request input for receiving a request for bus control from the at least one agent;
at least one acknowledgment output for indicating that the at least one agent has won arbitration:
a first state machine for indicating that a first agent has won arbitration based upon a programmable weight assigned to the first agent, wherein the first state machine is coupled to the at least one request input and the at least one acknowledgment output; and
a bandwidth control register for storing the programmable weight.

23. An arbiter for arbitrating among at least one agent for control of a bus, the arbiter comprising:
at least one request input for receiving a request for bus control from the at least one agent;
at least one acknowledgment output for indicating that the at least one agent has won arbitration; and
a first state machine for indicating that a first agent has won arbitration based upon a weight assigned to the first agent, wherein the first state machine is coupled to the at least one request input and the at least one acknowledgment output,
wherein the first state machine controls arbitration at a kth level, the arbiter further comprising a second state machine for controlling arbitration at a higher k-1th level, the second state machine being coupled to receive a request from k-1th level agents including a second agent and a winner of the kth level arbitration.

24. The arbiter of claim 23, wherein the first state machine acknowledges that the first agent has won arbitration at the kth level if the first agent has a highest kth level priority among kth level agents asserting requests.

25. The arbiter of claim 23, wherein the first agent is assigned a kth level priority and a kth level weight $W_k$ in the first state machine, the first state machine for indicating that the first agent has won arbitration at the kth level based upon $W_k$.

26. The arbiter of claim 25, wherein all agents together at the kth level are assigned a total weight $Z_k$, the first state machine for guaranteeing bus control to the first agent for at least $W_k$ arbitrations out of $Z_k$ arbitrations in which the first agent requests bus control and a kth level agent wins bus control.

27. The arbiter of claim 25, wherein $W_k$ corresponds to $W_k$ arbitration states at the kth level, all agents together at the kth level are assigned a total weight $Z_k$ corresponding to $Z_k$ arbitration states at the kth level, and each state represents a grant of bus control to a corresponding agent.

28. The arbiter of claim 25, wherein all agents together at the kth level are assigned a total weight $Z_k$, the first state machine for guaranteeing a fraction $W_k/Z_k$ of the bandwidth at level k to the first agent.

29. The arbiter of claim 23, wherein the kth level winning agent and the second agent at the k-1th level are assigned k-1th level priorities in the second state machine, the kth level winning agent representing a class of kth level agents at the k-1th level that win kth level arbitration, the second state machine for acknowledging that the kth level winning agent wins arbitration at the k-1th level if the kth level winning agent has a highest k-1th level priority among k-1th level agents asserting requests.

30. The arbiter of claim 29, the second state machine for acknowledging that the second agent wins arbitration at the k-1th level if the second agent has a highest k-1th level priority among k-1th level agents asserting requests.

31. An arbiter for arbitrating among at least one agent for control of a bus, the arbiter comprising:

at least one request input for receiving a request for bus control from the at least one agent;

at least one acknowledgment output for indicating that the at least one agent has won arbitration; and a first state machine for indicating that a first agent has won arbitration based upon a weight assigned to the first agent, wherein the first state machine is coupled to the at least one request input and the at least one acknowledgment output, wherein the first agent includes a timer for determining the expiration of a predetermined waiting period, and a control circuit for asserting an adjustable low priority request and raising the adjustable low priority request to a high priority request after expiration of the waiting period.

32. The arbiter of claim 31, wherein the waiting period is selected so that a worst case latency constraint of an associated bus agent is satisfied.

33. The arbiter of claim 31, wherein the timer and the control circuit are incorporated into a first bus agent that contends for arbitration with a second bus agent, the first state machine for determining that the first agent wins arbitration if the first agent asserts a high priority request and the second agent asserts either a low priority request or no request.

34. The arbiter of claim 33, wherein the arbiter grants control of the bus to the winning agent.

35. An apparatus for requesting control of a bus comprising:

a timer for determining the expiration of a predetermined waiting period; and a control circuit for asserting an adjustable low priority request and raising the adjustable low priority request to a high priority request after expiration of the waiting period, wherein the timer and the control circuit are incorporated into a first bus agent, the apparatus further comprising an arbiter for determining that the first agent wins arbitration if the first agent asserts a high priority request and a second agent asserts either a low priority request or no request.

36. An apparatus for requesting control of a bus comprising:

a timer for determining the expiration of a predetermined waiting period;

a control circuit for asserting an adjustable low priority request and raising the adjustable low priority request to a high priority request after expiration of the waiting period, wherein the timer and the control circuit are incorporated into a first bus agent.

an arbiter for determining that the first agent wins arbitration if the first agent asserts a high priority request and a second agent asserts either a low priority request or no request, wherein the arbiter grants control of the bus to the winning agent.

37. A method of arbitrating among at least one agent for control of the bus, the method comprising the steps of:

a first agent asserting an adjustable low priority request for control of the bus;

raising the adjustable low priority request to a high priority request if the adjustable low priority request is not granted after a predetermined waiting period;

a second agent asserting a request; and determining that the first agent wins arbitration and granting control of the bus to the first agent if the first agent asserts a high priority request and the second agent asserts either a low priority request or no request.

38. A method of arbitrating among at least one agent for control of a bus, the method comprising:

asserting, by a first agent, a request for control of the bus; and granting exclusive control of the bus to the first agent based upon the weight assigned to the first agent that is not dependent on age and based upon a priority of each of the agents asserting requests, said weight indicating a number of arbitration rounds that a priority status of the first agent is retained.

39. A method of arbitrating among at least one agent for control of a bus, the method comprising:

asserting a request, by a first agent, for control of the bus, the fast agent being assigned a weight W corresponding to W arbitration rounds that a priority of the first agent is retained, all agents together being assigned a total weight Z corresponding to Z arbitration rounds, each round representing grant of bus control to a corresponding agent; and granting exclusive control of the bus to the first agent based upon a w&eight assigned to the first agent that is not dependent on age.

* * * * *

UNITED STATES PATENT AND TRADEMARK OFFICE
CERTIFICATE OF CORRECTION

PATENT NO.    : 6,385,678 B2
DATED         : May 7, 2002
INVENTOR(S)   : Eino Jacobs et al.

It is certified that error appears in the above-identified patent and that said Letters Patent is hereby corrected as shown below:

<u>Title page,</u>
Item [56], OTHER PUBLICATIONS, please insert
-- Abstract, Steven Davis et al., "EISA vs. MCA: Which is Better?", PC Magazine Vol. 7 No. n20, pp 35 (11/29/88)

Abstract, Kenneth McIntyre, "The Communications Process for the VAXBI - INF", Digital Design v 16n10, pp 100-03 (September 1986)

Abstract, M.K. Vernon et al., "Distributed Round Robin and First-come First-serve Protocols and their Application to Multiprocessor Bus Arbitrary", 15th Annual International Symposium on Computer Architecture, pp. 269-77 (1998).

Abstract, Technical Committee on Microprocessors and Microcomputers of the IEEE Computer Society, "IEEE Standard for a Versatile Backplane Bus", p 320 (1987).

Abstract D. Schmidt, "the AMS-M-Bus and its Interface Modules", Siemens Components (English Edition), Vol. 20 No. 4, pp 143-47 (August 1985).

Abstract , Motorola, Inc., "Motorola Introduces the MC145488 Dual Data Link Controller for HDLC Protocol Applications", Tactical Marketing (3/12/90).

Abstract, Diamond Pt. International, "High Speed Multidrop Parallel DMA Controller Drastically Reduces Software Overhead", Technology Marketing Management Ltd. (July 1989).

Abstract, Intel Corporation, "Intel Enhances Multibus (R) II Architecture with Modular, Stackable I/O Technology" (9/14/89).

Abstract, Lindhult & Jones, Inc., "Superfast VMEbus Compatible 68000 Processor Board with Dual Cache and Zero Wait States Introduced by Plessey Microsystems" (11/25/85).

Abstract, Philips, "Philips PG2900 VMEbus System Controller Module" (August 1985).

Abstract, Graham Entwistle et al., "Bus Arbitration Algorithm and Apparatus", U.S. Patent No. 5,377,332 (12/27/94). --

UNITED STATES PATENT AND TRADEMARK OFFICE
CERTIFICATE OF CORRECTION

PATENT NO. : 6,385,678 B2
DATED : May 7, 2002
INVENTOR(S) : Eino Jacobs et al.

It is certified that error appears in the above-identified patent and that said Letters Patent is hereby corrected as shown below:

<u>Title page (cont.),</u>
Item [57], ABSTRACT,
Line 5, replace "that" with -- the --.

<u>Column 12,</u>
Line 17, please delete second "is".
Line 17, please replace "stale" with -- state --.

<u>Column 13,</u>
Line 24, remove "and".
Line 27, after "period;" please insert -- and --.
Line 39, insert -- and --.
Line 40, please delete -- a --.

<u>Column 14,</u>
Line 38, please replace "arbitration:" with -- arbitration; --.

<u>Column 16,</u>
Line 22, please replace "agent" with -- agent; and --.
Line 53, please replace "fast" with -- first --.
Line 59, please replace "w&eight" with -- weight --.
Line 58, please add new paragraph beginning with "granting".

Signed and Sealed this

Fifteenth Day of October, 2002

*Attest:*

JAMES E. ROGAN
*Director of the United States Patent and Trademark Office*

*Attesting Officer*